United States Patent [19]
Chi et al.

[11] 4,120,851
[45] Oct. 17, 1978

[54] PROCESS FOR POLYMERIZING HIGH NITRILE ABS POLYBLENDS

[75] Inventors: Henry K. Chi, Longmeadow; Alton L. Higgins, Springfield, both of Mass.

[73] Assignee: Monsanto Company, St. Louis, Mo.

[21] Appl. No.: 826,442

[22] Filed: Aug. 22, 1977

[51] Int. Cl.² .......................................... C08F 297/04
[52] U.S. Cl. ................................................ 260/880 R
[58] Field of Search ................................... 260/880 R

[56] References Cited

U.S. PATENT DOCUMENTS

| | | | |
|---|---|---|---|
| 3,671,607 | 6/1972 | Lee | 260/880 R |
| 3,880,786 | 4/1975 | Feast | 260/880 R |
| 3,991,136 | 11/1976 | Dalton | 260/880 R |
| 4,011,283 | 3/1977 | Sturt | 260/880 R |
| 4,042,647 | 8/1977 | Cornell | 260/880 R |
| 4,046,839 | 9/1977 | Papetti | 260/880 R |

Primary Examiner—Paul R. Michl
Attorney, Agent, or Firm—Joseph S. Nelson; William J. Farrington; James C. Logomasini

[57] ABSTRACT

The process relates to polymerizing mixtures of diene rubber with a monomer formulation comprising monovinylidene aromatic and ethylene unsaturated nitrile monomers wherein a late add of monovinylidene aromatic monomer is added after 85 to 98% conversion of the monomer formulation providing high nitrile ABS polyblends having improved color and toughness.

20 Claims, No Drawings

PROCESS FOR POLYMERIZING HIGH NITRILE ABS POLYBLENDS

BACKGROUND OF THE INVENTION

As is well known, polyblends of rubbers with styrene/acrylonitrile type interpolymers have advantages in providing compositions of desirable properties including toughness and chemical resistance, as well as providing good formability. Generally, increasing the rubber content is advantageous in increasing the toughness, but some reduction in other properties such as gloss is generally experienced with increase in rubber content.

Prior art processes for preparing such polyblends are known wherein the rubber is grafted in emulsion with said monomers. Such prior art processes have not produced homogeneous polyblends with optimum toughness and color. This is particularly true in polymerizing monomer formulations having greater than 24% by weight of nitrile monomers, e.g. styrene and acrylonitrile will yield interpolymers of various compositions; a mixture containing a 76% by weight styrene and 24% by weight acrylonitrile will form interpolymers having the same composition as the monomers at any conversion. However, if the acrylonitrile ranges from 30 to 70% then the interpolymer of the polyblend formed at higher conversion, i.e., greater than 85%, is not homogeneous having poor properties and color. By definition, those polyblends having greater than 30% of nitrile monomers in the interpolymers are considered high nitrile interpolymers and form high nitrile ABS polyblends.

It has not been found that the properties of the matrix and graft interpolymer phases of the polyblend becomes critical in preparing such polyblends having improved toughness and color. Monovinylidene aromatic monomers, e.g. styrene, and ethylene unsaturated nitrile monomers, e.g. acrylonitrile, have been found to copolymerize at different rates with the styrene type monomer adding to the interpolymer at faster rates. In high nitrile monomer formulations of styrene and acrylonitrile, the nitrile component increases percentagewise in the residual monomers as the conversion increases and adds as blocks of acrylonitrile to the matrix interpolymer or graft interpolymer. It has been found that these blocks of acrylonitrile lead to localized incompatibility in the polyblend reducing toughness and producing colored polyblends.

It is the objective of the present invention to provide an improved polymerization process that insures the production of ABS polyblends having homogeneous matrix and graft interpolymers giving polyblends of improved toughness and color.

SUMMARY OF THE INVENTION

The present invention relates to an improved process for preparing an ABS polyblend, the steps comprising:
A. emulsion polymerizing a mixture comprising a monomer formulation dispersed in a diene rubber aqueous latex, grafting at least a portion of said monomer formulation as superstrate interpolymer on said rubber as a substrate providing a graft copolymer, said monomer formulation comprising a monovinylidene aromatic monomer and an ethylenically unsaturated nitrile monomer, forming during polymerization thereof an ABS polyblend of said graft copolymer and a matrix interpolymer, the improvement comprising:
B. emulsion polymerizing said mixture to a conversion of from about 85 to 98% as a partially polymerized mixture,
C. charging additional monovinylidene aromatic monomer to said partially polymerized mixture in an amount of about 2–15% by weight of said monomer formulation,
D. further emulsion polymerizing said partially polymerized mixture in the presence of said additional monovinylidene aromatic monomer to essential completion, and
E. recovering said polyblend having improved color and impact strength.

DESCRIPTION OF THE PREFERRED EMBODIMENTS THE INTERPOLYMER

The interpolymers of the present invention of both the matrix and the graft superstrates consist at least principally of a monovinylidene aromatic hydrocarbon and an unsaturated nitrile, i.e., such monomers comprise at least 50.0% by weight and preferably at least 75.0% by weight of the interpolymers. Most desirably, such monomers comprise at least 90.0% by weight of the interpolymer and the usual commercial compositions are substantially completely comprised of such monomers although minor amounts, i.e., less than 5.0% by weight of other components such as chain transfer agents, modifiers, etc., may be included.

As will be readily appreciated, the interpolymers used for the graft superstrates should be compatible with the interpolymer of the matrix so as to obtain good properties which will require the presence of the similar monomers. Most desirably, the superstrate interpolymers closely approximate the chemical composition of the interpolymer of the matrix so as to obtain matching of the chemical properties, and, accordingly, it is desirable that the superstrates of both graft copolymers closely approximate each other. In addition, it is believed that increased chemical bonding is thereby obtained with commensurate improvement in chemical properties. Moreover, by close matching of certain interpolymers used in the matrix and superstrate such as those containing arcylate, it is possible to obtain a high degree of translucency and substantial transparency. However, it will be appreciated that deviations in the composition of the interpolymers of the matrix and superstrates such as different monomers and/or ratios may be desirable for some applications and that some deviations may inherently occur as the result of process variables.

Exemplary of the monovinylidene aromatic hydrocarbons which may be used in the interpolymers are styrene; alpha-alkyl monovinylidene monoaromatic compounds, e.g. alpha-methylstyrene, alpha-ethylstyrene, alpha-methylvinyltoluene, alpha-methyl dialkylstyrenes, etc.; ring-substituted alkyl styrenes, e.g., vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halosubstituted styrenes, e.g. 2-chloro-4-methylstyrene, 2,6-dichloro-4-methylstyrene, etc.; vinyl naphthalene; vinyl anthracene, etc. The alkyl substituents generally have 1 to 4 carbon atoms and may include isopropyl and isobutyl groups. If so desired, mixtures of such monovinylidene aromatic monomers may be employed.

Exemplary of the unsaturated nitriles which may be used in the interpolymers are acrylonitrile, methacrylonitrile, ethacrylonitrile and mixtures thereof.

Exemplary of the monomers which may be interpolymerized with the monovinylidene aromatic hydrocarbons and unsaturated nitriles are conjugated 1,3 dienes, e.g., butadiene, isoprene, etc.; alpha- or beta-unsaturated monobasic acids and derivatives thereof, e.g. acrylic acid, methyl acrylate, ethyl arcylate, butyl acrylate, 2-ethylhexyl acrylate, methacrylic acid and the corresponding esters thereof, acrylamide, methacrylamide; vinyl halides such as vinyl chloride, vinyl bromide, etc.; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of these comonomers which may be included in the interpolymer will vary as the result of various factors.

In addition, the monomer formulation at the time of polymerization may include a preformed polymer such as a polymerized butadiene rubber or interpolymer thereof.

The polymerizable monomer formulation contains at least 30% by weight of the monovinylidene aromatic monomer and preferable at least 50% by weight thereof. They also contain at least 30% by weight of the unsaturated nitrile and preferably at least 50% by weight thereof. From the standpoint of highly advantageous commercial practice, the monomer formulations contain 30 to 70%, and preferably 35 to 65% by weight of the vinylidene aromatic hydrocarbon and 30 to 70%, and preferably 35 to 65% by weight of the unsaturated nitrile.

THE MATRIX

As is well known in the art, the polyblend is produced by polymerizing the monomers in the presence of the preformed rubber. It is believed that a portion of the polymer formed grafts onto the preformed rubber since it is generally not possible to extract the rubber from the polymerized mass with the usual rubber solvents although some of the rubber polymer may not be in actual chemical combination with the polymer.

Since 100% grafting efficiency is not usually attainable, at least a portion of the monomers polymerized in the presence of the preformed rubber will not chemically combine therewith so as to provide a matrix for the graft copolymers. This portion may be increased or decreased depending upon the ratio of monomers to rubber, the particular monomer formulation, the nature of the rubber, and the conditions of polymerization. Generally, interpolymers prepared without the inclusion of rubber will be compounded with material from the graft polymerization reactions to obtain the desired composition.

THE RUBBER SUBSTRATE

Various rubbers onto which the interpolymer may be grafted during the polymerization in the presence thereof are utilizable as the substrate of the graft copolymer including diene rubbers.

The preferred rubbers are diene rubbers or mixtures of diene rubbers, i.e., any rubbery polymers (a polymer having a second order transition temperature not higher than 0° centrigrade, preferably not higher than −20° centrigrade, as determined by ASTM Test D-746-52T) of one or more conjugated 1,3 dienes, e.g., butadiene, isoprene, piperylene, chloroprene, etc. Such rubbers include homopolymers and interpolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m-, and p-methylstyrenes, 2,4-dimethylstyrene, the ar-ethylstyrenes, p-tert-butylstyrene, etc.; an alpha-alkylstyrene, such as alpha-methylstyrene, alpha-ethylstyrene, alpha-methyl-p-methylstyrene, etc.; vinyl naphthalene, etc.); arhalo monovinylidene aromatic hydrocarbons (e.g., the o-, m-, and p-chlorostyrenes, 2,4-dibromostyrene, 2-methyl-4-chlorostyrene, etc); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g. acrylamide, methacrylamide, N-butyl acrylamide, etc.); unsaturated ketones (e.g. vinyl methyl ketone, methyl isopropenyl ketone, etc.); alpha olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and bromides, etc.); and the like.

Although the rubber may contain up to about 2% of a etc.); pyridines; vinyl esters (e.g. vinyl acetate, vinyl stearate, etc.); vinyl and vinylidene halides (e.g. the vinyl and vinylidene chlorides and bromides, etc.); and the like.

Although the rubber may contain up to about 2% of a cross-linking agent, based on the weight of the rubber-forming monomer or monomers, cross-linking may present problems in dissolving the rubber in the monomers for the graft polymerization reaction, particularly for a mass or suspension polymerization reaction. In addition, excessive cross-linking can result in loss of the rubbery characteristics. The cross-linking agent can be any of the agents conventionally employed for cross-linking diene rubbers, e.g., divinylbenzene, diallyl maleate, diallyl fumarate, diallyl adipate, allyl acrylate, allyl methacrylate, diacrylates and dimethacrylates of polyhydric alcohols, e.g. ethylene glycol dimethacrylate, etc.

A preferred group of rubbers are those consisting essentially of 75 to 100% by weight of butadiene and/or isoprene and up to 25% by weight of a monomer selected from the group consisting of monovinylidene aromatic hydrocarbons (e.g., styrene) and unsaturated nitriles (e.g. acrylonitrile), or mixtures thereof. Particularly advantageous substrates are butadiene homopolymer or an interpolymer of 90 to 95% by weight butadiene and 5 to 10% by weight of acrylonitrile or styrene.

Various techniques are customarily employed for polymerizing rubber monomers including mass, suspension and emulsion polymerization. Emulsion polymerization can be used to produce a latex emulsion which is useful as the base for emulsion polymerization of the graft copolymer.

GRAFT POLYMERIZATION PROCESSES

The graft copolymers are prepared by polymerizing monomers of the interpolymer in the presence of the preformed rubber substrate. Depending upon the ratio of monomers to rubber substrate and polymerization conditions, it is possible to produce both the desired degree of grafting of the interpolymer onto the rubber substrate and the polymerization of ungrafted interpolymer to provide a portion of the matrix at the same time.

Although the amount of interpolymer superstrate grafted onto the rubber substrate may vary from as little as 10 parts by weight per 100 parts of substrate to as much as 250 parts per 100 parts, and even higher, the preferred graft copolymers have a superstrate-substrate ratio of about 30–200:100 and most desirably about 70–150:100. With graft ratios above 30:100, a highly desirable degree of improvement in various properties generally is obtained.

EMULSION POLYMERIZATION PROCESS

In the emulsion polymerization process, the monomers and rubber substrate are emulsified in water by use of suitable emulsifying agents such as fatty acid soaps, alkali metal or ammonium soaps of high molecular weight alkyl or alkaryl sulfates and sulfonates, mineral acid salts of long chain aliphatic amines, etc. Emulsifying agents which have proven particularly advantageous are sodium oleate, sodium palmitate, sodium stearate and other sodium soaps. Generally, the emulsifying agent is provided in amounts of about 1 to 15 parts by weight per 100 parts by weight of the monomers, and water is provided in an amount of about 1 to 4 parts per part of monomers, and even in larger ratios where greater dilution is desirable.

If so desired, an aqueous latex formed in the emulsion polymerization of the rubber substrate may provide the aqueous medium into which the monomers are incorporated with or without additional emulsifying agents, etc. However, the rubber may be dissolved in the monomers and the mixture emulsified, or a latex thereof may be separately prepared.

Various water-soluble free radical polymerization initiators are conventionally used for emulsion polymerization of the rubber monomer including conventional peroxy and perazo catalysts and the resultant latex may be used as the aqueous medium with which the interpolymer monomers are admixed. In this manner, the catalyst for the rubber polymerization may function in whole or in part as the catalyst for the graft polymerization. However, additional catalyst may be added at the time of graft polymerization. Exemplary of suitable peroxy catalysts are the alkali metal peroxides, persulfates, perborates, peracetates and percarbonates, and hydrogen peroxide. If so desired, the catalysts may be activated to form redox systems. In addition, it may be advantageous to include an oil-soluble catalyst such as those hereinbefore identified for mass-emulsion polymerization processes. However, other free-radical generating catalyst may be employed such as actinic radiation.

Chain transfer agents and other polymerization modifiers may desirably be included and it is generally advantageous to incorporate a higher alkyl mercaptan, such as tert-dodecyl mercaptan, which acts both as a promoter and a regulator. In addition, antioxidants and stabilizers such as the alkylated phenols may be added.

The emulsion mixture is then polymerized in an inert atmosphere at temperatures in the range of 20° to 100° centigrade with agitation. Pressures of 1 to 100 pounds per square inch may be employed and the monomer formulation and/or additional catalyst may be added incrementally or continuously over a portion of the reaction cycle.

The improved process of the present invention requires that the emulsion polymerization of step (B) be carried out to about 85 to 98% conversion forming a partial polymerized mixture followed by charging additional monovinylidene aromatic monomer to said partially polymerized mixture in an amount of about 2 to 15% by weight of said monomer formulation. An alternative mode of operation is to add said monomer formulation continuously or incrementally to said mixture during step (B).

The polyblends and polymerizing mixture contain from about 5 to 25.0% by weight rubber moiety and depending on the level of grafted interpolymer the grafted rubber copolymer is present in the polyblend in amounts of from 2 to 50% by weight of said polyblend.

The grafted rubber copolymer is dispersed as rubber particles in the polymerizable mixture and have an average particle size diameter of from about 0.03 to 1.0 microns with a preferred size ranging from about 0.2 to 0.6 microns in diameter. The grafted rubber particles are dispersed in the matrix interpolymer phase to form an ABS polyblend. Additional matrix polymer may be blended with said polyblend by melt colloiding to vary the amount of grafted rubber phase relative to toughness and other physical properties.

EXAMPLES

Example 1 — Control A

To 200 parts of a latex of a butadiene-acrylonitrile (93:7) copolymer rubber containing 50% of rubber solids were added 300 parts of water and 1 part of Duponol ME, an emulsifier of sodium lauryl sulfate. The emulsion was purged with nitrogen for deoxygenation and heated to 75° C. with agitation. At 75° C., 17 parts of a monomer formulation of acrylonitrile and styrene (55:45) containing 1.0 part per hundred parts of monomer formulation of tertiary dodecyl mercaptan was added. The graft reaction time at this point was termed zero batch time. At 0.25 hour, 0.27 parts of potassium persulfate, an initiator, in a 3% aqueous solution was charged to initiate the free radical polymerization. At 0.5 hour, a continuous monomer formulation charge of 133 parts of the above mentioned acrylonitrile, styrene and tertiary dodecyl mercaptan composition commenced. The continuous monomer charge took place over 2.3 hours. Simultaneously at 1.3 hours, 0.81 parts of potassium persulfate in a 3% aqueous solution was added continuously to the reaction over a 2.5 hour period. To prevent emulsion from complete coagulation, 1.5 parts of Duponol ME in a 4.5% aqueous solution was charged at 2.8 hour reaction time. The reaction was completed at 4 hours. Conversion of monomer was near completion. The grafted latex at this stage was in a creamy form. Latex pH was 9.3. The thickened latex was cooled, stabilized with antioxidants, coagulated by adding a 3% (weight) aqueous solution of magnesium sulfate, washed and dried with air at 65°–75° C. The recovered rubbery polymer was diluted with an acrylonitrile/styrene copolymer (68:32) to form a polyblend with a final rubber composition of 20 weight percent. The dilution was accomplished by mechanical blending following with melt extrusion at 450° F. stock temperature to yield uniformly dispersed resin particles. The final resin was molded by a conventional injection molding machine for property evaluations. The color of the final product was brown. Izod impact and Gardner impact for the polyblend were 4.0 ft.-lbs./in. and 25 in-lbs. respectively.

Example 2 — Control B

Example 1 was repeated except that the principal initator was di-isopropyl benzene hydroperoxide (DIBHP) which was used in a redox polymerization system consisting of three water soluble components, ferrous sulfate, disodium salt of ethylene diamine tetra acetic acid (EDTA.2Na) and sodium formaldehyde sulfoxylate (SFS). DIBHP catalyst was added continuously as a solution in the monomer formulation. In this experiment, 2.0 weight percent of the DIBHP based on the total monomer charge was used. Simultaneously 0.7 parts of the SFS/FeSO$_4$.6H$_2$O/EDTA.2Na components in a 1.6% aqueous solution was charged continuously to initiate the redox polymerization. The SFS/FESO$_4$.6H$_2$O/EDTA.2Na concentration was 0.7/0.006/0.008 parts per 100 parts monomer respectively. The grafting temperature was 75° C. This part of the reaction was completed in 3.5 hours. The reaction was then carried to 86% conversion by a continuous addition of 0.044 parts of potassium persulfate per 100 parts of monomer in a 0.5% aqueous solution. The reaction ran for an additional hour. The graft polymer was then processed and evaluated. The Izod and Gardner impacts were 6.7 ft.-lbs./in. and 91 in-lbs., respectively. The color of the final product was brown.

Example 3 — Control C

Example 1 was repeated except that the potassium persulfate initiator concentration was reduced by 60 weight percent and the initial emulsifier charge was deleted. The latex pH was adjusted by potassium hydroxide solution at the beginning of the reaction to yield a final latex pH of 10.7. Latex stability of this experiment was improved. Monomer conversion was nearly 100%. The polyblend color was brown. Izod impact was 5.1 ft.-lbs./in. and Gardner impact was 94 in-lbs.

Example 4

Example 3 was repeated except that 20% (weight) of the styrene monomer was held back as the late styrene monomer add. For this case, the acrylonitrile-styrene monomer solution was charged continuously over 2.7 hours. At this point where the monomer conversion was about 85%, the late continuous styrene monomer addition commenced. The reaction was continued at 75° C. for 1.0 hour. At the reaction completion time, the latex was stable. The monomer conversion was 98.8%. Izod and Gardner impacts were 5.6 ft-lbs./in. and 132 in-lbs., respectively. Color of the polyblend was light yellow.

EXAMPLE 5

Example 4 was repeated except that the late continuous styrene charge was added in 0.5 hour. The resultant Izod and Gardner impacts were 9.6 ft.-lbs./in. and 125 in-lbs., respectively. Color of the polyblend was light yellow.

Example 6

Example 4 was repeated except that the Duponol ME emulsifier was replaced by rubber reserve soap. The resultant polyblend was light yellow in color with a Gardner impact of 128 in-lbs. and an Izod impact of 6.8 ft.-lbs./in.

Example 7

Example 4 was repeated except that the total graft monomer formulation of acrylonitrile and styrene was changed to 65:35. The final polyblend color was light yellow with high Gardner impact strength, 135 in-lbs.

Example 8

Example 4 was repeated except that the total graft monomer formulation of acrylonitrile and styrene was changed to 30:70. The final polyblend color was nearly water white in color with Gardner and Izod impact strength at 110 and 5.1 respectively. The matrix composition for this polyblend was a 30/70 AN/S copolymer.

Example 9

Example 4 was repeated except that the total graft monomer formulation of acrylonitrile and styrene was 70:30. The polyblend color was yellow with high impact strength.

Table I below summarizes the several examples for comparison purposes. It is evident from the data that the late add of styrene unexpectedly improved the toughness, color and stability of the latex.

TABLE I

| Example | 1 | 2 | 3 | 4 | 5 | 6 | 7 | 8 | 9 |
|---|---|---|---|---|---|---|---|---|---|
| | control | control | control | ← | Late Styrene Add implemented | | | → | → |
| Latex Stability | poor | stable | stable | stable | stable | stable | stable | stable | stable |
| Izod Impact (ft.lb/in.) | 4.0 | 6.7 | 5.1 | 5.6 | 9.6 | 6.8 | 6.7 | 5.1 | 6.9 |
| Gardner Impact (in-lb) | 25 | 91 | 94 | 132 | 125 | 128 | 135 | 110 | 130 |
| Product Color | Brown | Brown | Brown | ← | light | yellow | → | → | yellow |
| Rubber Latex | 734 | 734 | 650 | 650 | 630 | 650 | 650 | 650 | 650 |
| Dist H$_2$O | 736 | 736 | 850 | 850 | 850 | 850 | 850 | 850 | 850 |
| AN | 247 | 247 | 231 | 247 | 248 | 248 | 273 | 132 | 308 |
| S | 203 | 203 | 189 | 162 | 162 | 162 | 117 | 282 | 88 |
| Late S | None | None | None | 41 | 40 | 40 | 30 | 26 | 44 |
| at Conversion | | | | 85% | 88% | 86% | 86% | 90% | 85% |
| Latex Stability | Set-up | Stable | Stable | Stable | Stable | Stable | Stable | Stable | Stable |
| Conversion, % | 95 | 85 | 95 | 98.8 | 97 | 97 | 98.5 | 98.2 | 97 |

What is claimed is:

1. In a process for preparing an ABS polyblend by:
   A. emulsion polymerizing a mixture consisting essentially of a monomer formulation dispersed in a diene rubber aqueous latex, grafting at least a portion of said monomer formulation as superstrate interpolymer on said rubber as a substrate providing a graft copolymer, said monomer formulation consisting essentially of a monovinylidene aromatic monomer and an ethylenically unsaturated nitrile monomer, forming during polymerization thereof an ABS polyblend of said graft copolymer and a matrix interpolymer, the improvement comprising:

B. emulsion polymerizing said mixture to a conversion of from about 85 to 98% as a partially polymerized mixture, C. charging additional monovinylidene aromatic monomer as a sole monomer to said partially polymerized mixture in an amount of about 2–15% by weight of said monomer formulation, D. further emulsion polymerizing said partially polymerized mixture in the presence of said additional monovinylidene aromatic monomer to essential completion, and E. recovering said polyblend having improved color and impact strength.

2. A process of claim 1 wherein a free radical generating catalyst is present in said polymerizable mixture during the polymerization thereof.

3. A process of claim 1 wherein said catalyst is present in an amount of from about 0.001 to 2.0% by weight of said monomer formulation.

4. A process of claim 1 wherein said catalyst is selected from the group consisting of water soluble and oil soluble catalysts and mixtures thereof.

5. A process of claim 1 wherein said water soluble catalyst is selected from the group consisting of alkali metal peroxides, persulfates, perborates, peracetates, percarbonates and hydrogen peroxide or mixtures thereof.

6. A process of claim 1 wherein said catalyst is activated forming a redox catalyst system.

7. A process of claim 1 wherein said catalyst is potassium persulfate.

8. A process of claim 1 wherein said polymerization of step (A) is carried out in an aqueous emulsion having said polyermizable mixture dispersed therein, said graftable diene rubber being dispersed as rubber particles having a weight average particle size diameter of from about 0.03 to 1.0 microns.

9. A process of claim 1 wherein the rubber substrate is a diene rubber polymer having at least about 75% by weight of a conjugated 1,3 diene monomer.

10. A process of claim 1 wherein said ABS polyblend formed has present about 2 to 50% by weight of said graft copolymer.

11. A process of claim 1 wherein said monomer formulation comprises from about 30 to 70% by weight of a monovinylidiene aromatic monomer and 30 to 70% by weight of an ethylenically unsaturated nitrile monomer.

12. A process of claim 1 wherein said monomer formulation has a weight ratio to said graftable rubber of from about 10–250:100 in said polymerizable mixture.

13. A process of claim 1 wherein said monovinylidene aromatic monomer is styrene.

14. A process of claim 1 wherein said ethylenically unsaturated monomer is acrylonitrile.

15. A process of claim 1 wherein said superstrate and matrix interpolymers have present about 35 to 65% styrene and about 35 to 65% acrylonitrile.

16. A process of claim 1 wherein said rubber substrate is a diene rubber polymer having about 75 to 100% by weight of a conjugated 1,3 diene monomer and 0 to 25% by weight of a comonomer selected from the group consisting of styrene and acrylonitrile.

17. A process of claim 1 wherein at least a portion of said monomer formulation is added continuously or incrementally to said mixture during said polymerization in step (B).

18. A process of claim 1 wherein additional matrix interpolymer is blended with said polyblend as step (F).

19. In a process for preparing an ABS polyblend by:

A. emulsion polymerizing a mixture consisting essentially of a monomer formulation dispersed in a diene rubber aqueous latex, grafting at least a portion of said monomer formulation as superstrate interpolymer on said rubber as a substrate providing a graft copolymer, said monomer formulation consisting essentially of a monovinylidene aromatic monomer and an ethylenically unsaturated nitrile monomer, forming during polymerization thereof an ABS polyblend of said graft copolymer and a matrix interpolymer, the improvement comprising:

B. emulsion polymerizing said mixture to a conversion of from about 85 to 98% as a partially polymerized mixture, C. charging additional monovinylidene aromatic monomer as a sole monomer to said partially polymerized mixture in an amount of about 2–15% by weight of said monomer formulation, D. further emulsion polymerizing said partially polymerized mixture in the presence of said additional monovinylidene aromatic monomer to essential completion, and E. recovering said polyblend having improved color and impact stength, said monomer formulation being 30 to 70% by weight styrene monomer and 30 to 70% by weight acrylonitrile monomer, said diene rubber having at least 75% by weight of a butadiene monomer, said rubber being present as grafted rubber particles having a particle size of 0.03 to 1.0 microns, said additional monovinylidene aromatic monomer being styrene monomer, said ABS polyblend formed having present about 10 to 50% by weight of said graft copolymer, said graft copolymer being grafted with 20–250 parts of superstrate interpolymer per 100 parts of rubber.

20. A process of claim 19 wherein at least a portion of said monomer formulation is added to said mixture continuously or intermittently during step (B).

* * * * *